United States Patent
Ariga et al.

(10) Patent No.: US 6,771,046 B2
(45) Date of Patent: Aug. 3, 2004

(54) METHOD AND SYSTEM FOR CONTROLLING CHARGING OF BATTERIES

(75) Inventors: Kyoichi Ariga, Saitama (JP); Takashi Sone, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/329,687

(22) Filed: Dec. 27, 2002

(65) Prior Publication Data

US 2003/0169017 A1 Sep. 11, 2003

(30) Foreign Application Priority Data

| Jan. 10, 2002 | (JP) | 2002-003616 |
| Jan. 17, 2002 | (JP) | 2002-008962 |
| Jan. 17, 2002 | (JP) | 2002-008964 |

(51) Int. Cl.[7] .................. H01M 10/44; H01M 10/46
(52) U.S. Cl. ............................... 320/125; 320/160
(58) Field of Search ........................... 320/124, 125, 320/131, 157, 160, 162, 163, 164

(56) References Cited

U.S. PATENT DOCUMENTS

| 4,609,860 A | * | 9/1986 | Fasen ..................... 320/131 |
| 5,440,221 A | * | 8/1995 | Landau et al. .............. 320/155 |
| 6,100,668 A | * | 8/2000 | Takano ....................... 320/148 |
| 6,337,560 B1 | * | 1/2002 | Kalogeropoulos et al. .. 320/160 |

* cited by examiner

Primary Examiner—Edward H. Tso
(74) Attorney, Agent, or Firm—Birch, Stewart, Kolasch & Birch, LLP

(57) ABSTRACT

A method of controlling the charging of a secondary battery (battery) without deterioration of a charging/discharging characteristic of the battery. An ordinary charging portion performs a first charging control specified to stop the charging at a charge level less than a full-charge level is used in combination with a refresh charging portion for performing a second charging control specified to stop the charging at a charge level more than the full-charge level. When the charging by the ordinary charging portion is continuously repeated by, for example, 10 times, a switching portion is switched such that the next charging is performed by the refresh charging portion. A counter, which is reset when the charging by the refresh charging portion is terminated, is provided for deciding whether or not the number of times of the repeated charging reaches 10. The counter can be replaced with means having a function of outputting, if a random number generated by a random number generator is a specific value, a switching command to the switching portion.

21 Claims, 10 Drawing Sheets

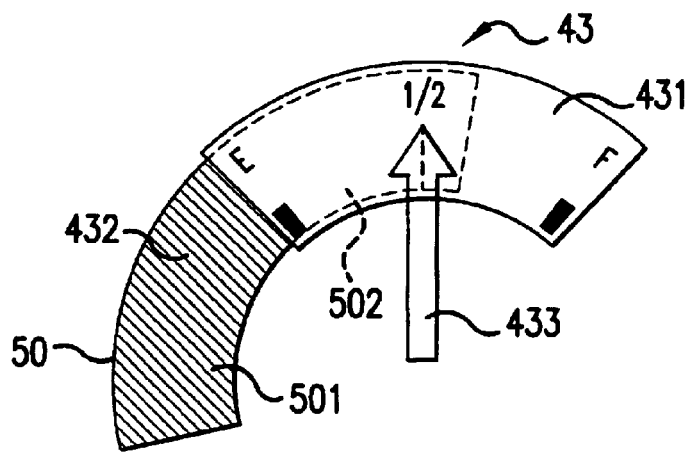
FIG.10
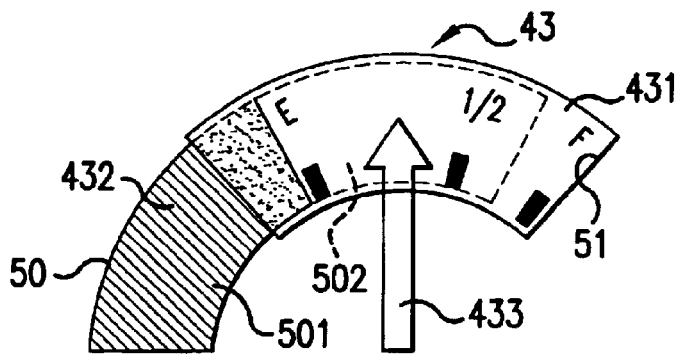
FIG.11
BEFORE DETERIORATION
▨▨▨▨▨▨▨▨ FULL-CHARGE LEVEL
☐☐☐☐☐☐☐☐ EMPTY
FIG.12
AFTER DETERIORATION
■■▨▨▨▨▨▨ FULL-CHARGE LEVEL
■■☐☐☐☐☐☐ EMPTY
FIG.13

METHOD AND SYSTEM FOR CONTROLLING CHARGING OF BATTERIES

CROSS-REFERENCE TO RELATED APPLICATIONS

The present nonprovisional application claims priority under 35 USC 119 to Japanese Patent Application No. 2002-003616 filed on Jan. 10, 2002; Japanese Patent Application No. 2002-008962 filed on Jan. 17, 2002 and Japanese Patent Application No. 2002-008964 filed on Jan. 17, 2002 the entire contents thereof are hereby incorporated by reference.

BACKGROUND OF THE INVENTION

1. Field of the Invention

The present invention relates to a method of and a system for controlling the charging of a secondary battery, and particularly to a method of and a system for controlling the charging of a secondary battery, which are suitable for enhancing the durability of the secondary battery, that is, keeping the initial charging/discharging performance of the secondary battery for a long-period of time.

2. Description of Background Art

In the case of charging a secondary battery using nickel oxide as the material of a cathode (positive electrode), for example, a nickel-cadmium battery or a nickel-hydrogen battery, as the battery is charged to a full-charge level, oxygen gas is generated at the positive electrode. If the generation of the oxygen gas is continued, the inner pressure of the secondary battery is raised. Accordingly, the oxygen gas thus generated is required to be consumed by local cell reaction on the surface of an anode (negative electrode). In general, taking into account the gradual reduction in capacity of the negative electrode by the local cell reaction, the capacity of the negative electrode is set to be larger than that of the positive electrode. For example, a ratio (NP ratio) of the capacity of the negative electrode to that of the positive electrode is set to a value in a range of about 1.65 to 2.0. However, since the charging capacity of the battery is increased with the positive electrode taken as a rate-limiting factor, the increased capacity of the negative electrode brings enlargement of the secondary battery but does not contribute to an increase in charging capacity of the battery.

A charging method capable of suppressing the generation of oxygen gas by stopping the charging at a charge level less than a full-charge level, for example, 97% of the full-charge level has been proposed in Japanese Patent Laid-open No. Hei 5-111175. This charging method is advantageous in that since the generation of oxygen gas is suppressed, the reduction in capacity of a negative electrode by local cell reaction can be prevented, with a result that it is possible to reduce the capacity of the negative electrode, and hence to miniaturize the secondary battery, that is, increase the charging capacity.

The charging control to stop the charging at a charge level less than a full-charge level as described above is preferable from the viewpoint of the durability of a secondary battery; however, if the charging is usually stopped at a charge level less than the full-charge level, a state wherein several percent of electrode plates are not used is repeated. As a result, the unused electrode plates are deteriorated, which do not contribute to the charge amount.

By setting a voltage reference value (cut-off voltage) representative of a reference charge amount at which the charging is to be stopped, at a level as close to a full-charge level as possible, it is possible to reduce the number of the electrode plates not contributing to the charge amount. However, since the voltage of a secondary battery is dependent on a battery temperature and an environmental temperature, it is not easy to accurately detect that the voltage of the secondary battery reaches the cut-off voltage, and therefore, it is not expected to accurately control the charging of the secondary battery.

SUMMARY AND OBJECTS OF THE INVENTION

In view of the foregoing, the present invention has been made, and an object of the present invention is to provide a method of and a system for controlling the charging of a secondary battery, which are capable of preventing a reduction in full-charge amount due to repetition of the changing at a charge level less than the full-charge level.

It may be considered to periodically charging the secondary battery at a charge level more than the full-charge level. However, if the charging of the battery to a charge level more than the full-charge level is simply performed as conventional, there may occur a difference between the charging of the battery to a charge level less than the full-charge level and the charging of the battery to a charge level more than the full-charge level. Such a difference in charging time therebetween gives an unfavorable feeling to a user.

In view of the foregoing, the present invention provides a method of and a system for controlling the charging of a secondary battery, which are capable of preventing a reduction in a full-charge amount due to repetition of the changing at a charge level less than the full-charge level, and performing a simple control by means of which the charging time is usually kept nearly constant.

To achieve the above object, the present invention provides a method of controlling the charging of a secondary battery, including the steps of: controlling the charging of the secondary battery by using both a first charging control specified to stop the charging at a charge level less than a full-charge level and a second charging control specified to stop the charging at a charge level equal to or more than the full-charge level; wherein after the charging by the first charging control is continuously repeated by a specific number of times, the next charging is performed by the second charging control and if the state of the secondary battery satisfies a specific refresh discharge reference in the second charging control, the secondary battery is discharged before the charging of the secondary battery.

According to a second feature of the present invention, there is provided a system for controlling the charging of a secondary battery, including: first charging control means for stopping the charging at a charge level less than a full-charge level; second charging control means for stopping the charging at a charge level equal to or more than the full-charge level and deciding means for deciding that the charging by the first charging control means is continuously repeated by a specific number of times. A control means switching means is provided for switching, if it is decided by the deciding means that the charging by the first charging control means is continuously repeated by the specific number of times, the first charging control means to the second charging control means so as to perform the next charging by the second charging control means.

According to another feature of the present invention, there is provided a system for controlling the charging of a secondary battery, including: first charging control means for stopping the charging at a charge level less than a full-charge level; second charging control means for stopping the charging at a charge level equal to or more than the full-charge level and a random number generating means for generating a random number each time one charging by the first charging control means is performed. A control means switching means is provided for switching, if the random number generated by the random number generating means corresponds to a specific value equal to or less than the maximum value among the generated random numbers, the first charging control means to the second charging control means so as to perform the next charging by the second charging control means.

According to another feature of the present invention, the above control means switching means is configured such that the specific number of times of the repeated charging by the first charging control becomes less than 20.

According to a further feature of the present invention, the battery capacity, less than the full-charge level, at which the charging by the first charging control means is to be stopped, is composed of two-step battery capacities. A selecting means is provided for selecting either of the two-step battery capacities.

According to a still further feature of the present invention, the system further includes display means, wherein if a lower one of the two-step battery capacities is selected by the selecting means and the second charging control means is selected by the control means switching means, the display means displays a signal indicating that the selection is canceled.

According to the above features, after the first charging control specified to stop the charging at a charge level less than a full-charge level is continuously repeated by a specific number of times, the second charging control specified to stop the charging at a charge level more than the full-charge level is performed. In particular, according to the fourth feature, the control is performed such that the charging by the first charging control is not continuously repeated by 20 times or more.

According to one of the features of the present invention, the charging control can be selected such that the charging is stopped at a battery capacity, which is less than and apart from a full-charge level, and which is set before the charging reaches a battery capacity less than and close to the full-charge level. According to a feature of the invention, when the charging must be performed by the second charging control although the lower battery capacity has been selected by the fifth feature, such a state can be displayed, to thereby eliminate an inconvenience that a user is distrustful of the state.

According to one of the features of the present invention, the above refresh discharge reference is determined to be satisfied when the remaining capacity of the secondary battery is less than a specific value. According to a further feature of the present invention, the refresh discharge reference is determined to be satisfied each time the charging by the second charging control is repeated by a specific number of times.

If the charging of a secondary battery at a charge level at less than a full-charge level is repeated, it becomes impossible to ensure an initial charging/discharging characteristic of the secondary battery by a memory effect. To solve such a problem, according to the features of the present invention, after the first charging control specified to stop the charging at a charge level less than a full-charge level is continuously repeated by a specific number of times, the second charging control specified to stop the charging at a charge level more than the full-charge level is performed. Further, if the state of the secondary battery satisfies a refresh discharge reference, the refresh discharging is performed before the charging of the secondary battery to a charge level more than the full-charge level is performed. As a result, it is possible to efficiently eliminate the memory effect. In particular, according to the features of the present invention, it is possible to decide the discharging timing of the secondary battery on the basis of a simple refresh discharge reference. In addition, the charging by the second charging control is performed by a preceding charging performed at a second charging current larger than the first charging current and a subsequent charging performed at a third charging current smaller than the first charging current.

According to a feature of the present invention, a system is provided for controlling the charging of a secondary battery, including: cut-off voltage storing means for setting a cut-off voltage corresponding to a specific capacity less than a full-charge level of the second battery; first charging control means for charging the secondary battery at a first charging current and stopping the charging when a charging voltage of the secondary battery reaches the cut-off voltage; second charging control means for charging the secondary battery at a second charging current larger than the first charging current until the charging voltage of the secondary battery reaches the cut-off voltage, and then charging the secondary battery at a third charging current smaller than the first charging current until the charge level of the secondary battery reaches the full-charge level; and switching means for selecting either the first charging control means or the second charging control means.

According to a feature of the present invention, the above system further includes full-charge voltage storing means for storing a full-charge voltage of the secondary battery when the charging by the second charging control means is terminated; and correcting means for correcting a deteriorated proportion of the cutoff voltage on the basis of the value of the full-charge voltage stored in the full-charge voltage storing means.

According to a fourth feature of the present invention, the above system further includes full-charge voltage storing means for storing a full-charge voltage of the secondary battery when the charging by the second charging control means is terminated; setting means for setting a reference full-charge voltage at a specific temperature of the secondary battery and temperature storing means for storing a temperature of the secondary battery at the time when the full-charge voltage is stored in the full-charge voltage storing means. Correcting means are provided for correcting a deteriorated proportion of the cut-off voltage on the basis of the value of the full-charge voltage stored in the full-charge voltage storing means, the value of the temperature of the secondary battery stored in the temperature storing means and the reference full-charge voltage.

If the charging of a battery to a charge level less than the full-charge level is repeated, it becomes impossible to ensure an initial charging/discharging characteristic of the battery due to the memory effect. To solve such a problem, according to the features of the invention, after the first charging control specified to stop the charging at a charge level less than the full-charge level is continuously repeated by a specific number of times, the second charging control specified to stop the charging at a charge level more than the full-charge level is performed.

In particular, according to a feature of the invention, in the second charging control, since the preceding charging is performed at a large current, the charging time is shortened, and the subsequent charging performed at a charge level near the full-charge level is slowly performed, with a result that the total charging time can be made nearly equal to that required for the first charging control.

According to a feature of the present invention, since the charging current switching timing in the second charging control can be based on a cut-off voltage value in the first charging control, the control can be simply performed without the provision of any special decision means.

According to other features of the present invention, to cope with an inconvenience wherein the full-charge voltage by the second charging control is changed due to a deterioration of the secondary battery, the degree of deterioration of the secondary battery is decided on the basis of the stored value of the full-charge voltage, and the decision result can be reflected on the reference full-charge voltage. In particular, according to a feature of the present invention, the cut-off voltage can be corrected on the basis of not only the stored value of the full-charge voltage but also the stored value of the temperature of the secondary battery at the time of charging the battery to the full-charge level.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 10 is a front view of a remaining capacity displaying portion before deterioration of the battery;

FIG. 11 is a front view of the remaining capacity displaying portion after deterioration of the battery;

FIG. 12 is a view showing a segment display example of the battery remaining capacity before deterioration;

FIG. 13 is a view showing the segment display example of the battery remaining capacity after deterioration;

DETAILED DESCRIPTION OF THE PREFERRED EMBODIMENTS

Figure 1:
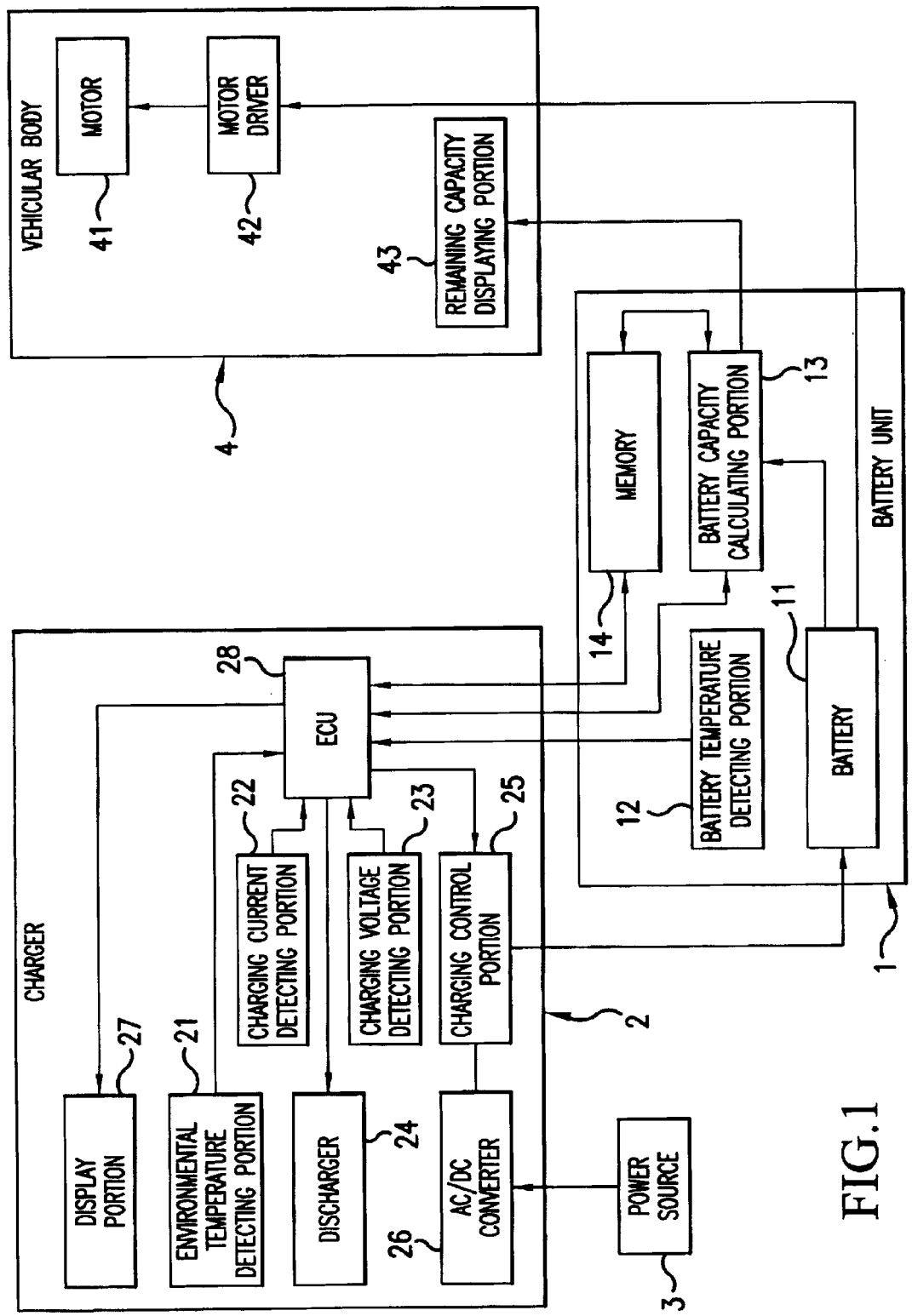
FIG. 1 is a block diagram showing a system configuration of a motor-driven vehicle including a battery charging control system according to one embodiment of the present invention.

Hereinafter, one embodiment of the present invention will be described with reference to the drawings. FIG. 1 is a block diagram showing a system configuration of a motor-driven vehicle including a secondary battery (hereinafter, referred to simply as a "battery") and a charger therefor. Referring to FIG. 1, a battery unit 1 is illustrated together with a charger 2 and a vehicular body 4. The battery unit 1 includes a battery 11, a battery temperature detecting portion 12, a battery capacity calculating portion 13, and a memory 14. The charger 2 includes an environmental temperature detecting portion 21, a charging current detecting portion 22, a charging voltage detecting portion 23, a discharger 24, a charging control portion 25, an AC/DC converter 26, a display portion 27, and an ECU 28 including a microcomputer. A current is supplied from a power source 3, for example, a household power source (100 V) to the charger 2 via the AC/DC converter 26. The vehicular body 4 includes a motor 41 for generating a motive power for the vehicular body, a motor driver 42 for controlling the motor 41, and a remaining capacity displaying portion 43 for displaying a remaining capacity of the battery 11. A current is supplied from the battery 11 to the motor driver 42.

The battery 11 is exemplified by a battery having a voltage/capacity of 24V/5 Ah, which can be obtained by a collection of, for example, 20 pieces of 1.2 V type Ni—MH (Ni-Metal Hydride) cells. These Ni—MH cells, each of which has a C-size and an NP ratio of about 1.2, are capable of attaining a battery capacity of 5 Ah (ampere×hr). Therefore, a compact battery is realized having a high energy density.

The arrangement of respective components of the above-described system is not limited to that shown in FIG. 1 but may be modified depending on the configuration of the motor-driven vehicle or the like. For example, the charging current detecting portion 22, the charging voltage detecting portion 23, the charging control portion 25, and the ECU 28 may be arranged not in the charger 2 but in the battery unit 1; and the remaining capacity displaying portion 43 may be arranged not in the vehicular body 4 but in the battery unit 1, or two of the remaining capacity displaying portions 43 may be arranged in both the vehicular body 4 and the battery unit 1.

The charging control of the battery 11 in the above-described system includes both a first charging control (hereinafter, referred to as "ordinary charging") and a second charging control (hereinafter, referred to as "refresh charging"). The ordinary charging of the battery 11 is characterized by stopping the charging at a charge level, which is close to and less than a full-charge level (equivalent to 100% of a rating capacity of the battery), for example, at a charge level of 97% of the full-charge level. The refresh charging of the battery is characterized by stopping the charging at a charge level, which is more than the full-charge level by a specific amount. In general, the refresh charging of the battery is performed after the ordinary charging of the battery is repeated by a plurality of times. To be more specific, the refresh charging is performed each time the number of times of the repeated ordinary charging has become a specific number or a random number made to occur for each ordinary charging corresponding to a specific value.

Figure 2:
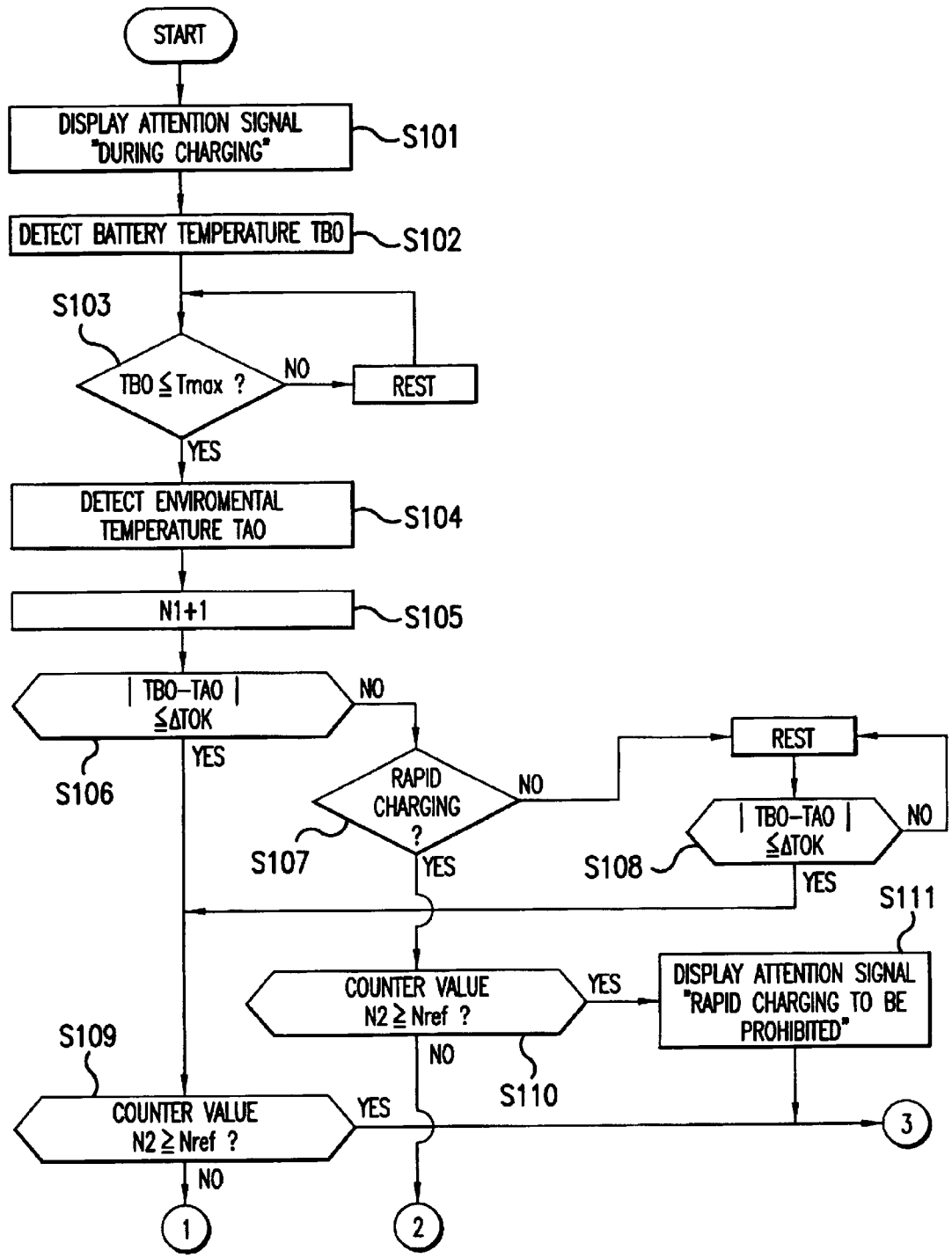
FIG. 2 is a flow chart showing a first essential process of ordinary charging.

The charging control of the battery 11 will be described in detail with reference to flow charts shown in FIGS. 2 to 5. FIG. 2 is a flow chart showing a first essential process of the ordinary charging. In steps S101 to S108, a procedure for deciding a temperature before charging is executed. In step S101, an attention signal "On Charging" is displayed on the display portion 27; In step S102, a battery temperature TB0 is detected by the battery temperature detecting portion 12. In step S103, it is decided whether or not the battery temperature TB0 is equal to or less than a predetermined charging starting temperature Tmax, which is set to, for example, a value in a range of 40 to 50° C. The processing in step S103 is repeated every specific resting time until the answer in step S103 becomes affirmative (YES). If the answer in step S103 becomes affirmative (YES), the process goes on to step S104. In step S104, an environmental temperature TA0 is detected by the environmental temperature detecting portion 21. In step S105, the value of a counter N1 for counting the number of times of the repeated ordinary charging is incremented by 1 (N1 N1+1). The total number of times of the repeated ordinary charging of the battery 11 can be detected from the value of the counter N1. In step S106, it is decided whether or not a difference between the environmental temperature TA0 and the battery temperature TB0 is equal to or less than a predetermined charging starting temperature difference ΔTOK, which is set to, for example, a value in a range of 0 to 10° C.

If the difference between the environmental temperature TA0 and the battery temperature TB0 becomes equal to or less than the charging starting temperature difference ΔTOK, the process goes on to step S109. In step S109, it is decided whether or not the value of a counter N2 is equal to or more than a reference value Nref. The counter N2 is different from the counter N1 for counting the total number of times of the repeated ordinary charging of the battery 11, and is used for counting the number of times of the repeated ordinary charging between one refresh charging and the next refresh charging. Accordingly, each time the refresh charging has been terminated, the counter N2 is reset to "1" (see step S138).

If the value of the counter N2 is equal to or more than the reference value Nref, the process goes on step S121 (shown in FIG. 4), to start the refresh charging procedure. Meanwhile, if the value of the counter N2 is less than the reference value Nref, the process goes on from step S109 to step S113 (shown in FIG. 3), to start the ordinary charging procedure. In this way, if the number of times of the ordinary charging repeated after the previous refresh charging becomes a specific number or more, the refresh charging is selected. The reference value Nref may be set to a value less than 20, preferably, 10. The reason for this will be described later with reference to FIG. 7.

It is to be noted that the selection of the charging mode is not necessarily based on the value of the counter N2 but may be, for example, based on the decision of whether or not a random number Nran made to occur for each ordinary charging corresponds to the reference value Nref. In the case where it is intended to perform the refresh charging each time the ordinary charging has been repeated by 10 times, the reference value Nref may be predetermined at either of 0 to 9, and a random number may occur in such a manner so as to be randomly selected from 0 to 9. With this setting, if the random number Nran corresponds to the reference value Nref, the process goes on to step S121 (see FIG. 4), so that the refresh charging is selected each time the ordinary charging has been repeated by about 10 times.

If the difference between the environmental temperature TA0 and the battery temperature TB0 is more than the charging starting temperature difference ΔTOK, the process goes on to step S107. In step S107, it is decided whether or not an indication "Rapid Charging" has been given. The rapid charging of the battery is a special mode for meeting a requirement to terminate the charging for a short period of time, and is characterized by stopping the charging at a charge level lower than a reference charge level. The reference charge level is the above-described charge level at which the ordinary charging is to be stopped, and is set to be slightly less than the full-charge level. For example, a rapid charging switch may be provided on the charger 2, and in this case, the answer in step S107 is determined on the basis of whether the switch is turned on or off. It is to be noted that the provision of the rapid charging mode is optional.

The charge level as the decision reference on the basis of which the rapid charging is to be stopped may be represented by a rate of temperature rise of the battery 11. To be more specific, a reference rate of temperature rise corresponding to the charge level as the decision reference may be previously set, and if a rate of temperature rise of the battery 11, which corresponds to the reference rate of temperature rise, is detected, the rapid charging may be stopped (see step S120).

If the rapid charging has been selected, the answer in step S107 becomes affirmative (YES), and the process goes on to step S110. In step S110, it is decided whether or not the value of the counter N2 is equal to or more than the reference value Nref. It is to be noted that the counter N2 is, as described above, for counting the number of times of the repeated ordinary charging between one refresh charging and the next refresh charging. If the value of the counter N2 is less than the reference value Nref, the process goes on from step S110 to step S112 (shown in FIG. 3), to start the rapid charging procedure. Meanwhile, if the value of the counter N is equal to or more than the reference value Nref, the process goes on to step S111. In step S111, an attention signal "Rapid Charging to be Prohibited" is displayed on the display portion 27, and then the process goes on to step S121 (shown in FIG. 4), to start the refresh charging procedure. It is to be noted that, like the decision function in step S109, the decision function in step S110 may be replaced with the decision function based on the comparison of a random number with a predetermined reference value.

If the answer in step S107 is denied (NO), that is, if the rapid charging has not been selected, the process goes on to step S108. In step S108, it is decided whether or not the difference between the environmental temperature TA0 and the battery temperature TB0 is equal to or less than the predetermined charging starting temperature difference ΔTOK. If the answer in step S108 is denied (NO), the decision in step S108 is repeated every specific resting time, and if the answer in step S108 is affirmative (YES), the process goes on to step S109.

Figure 3:
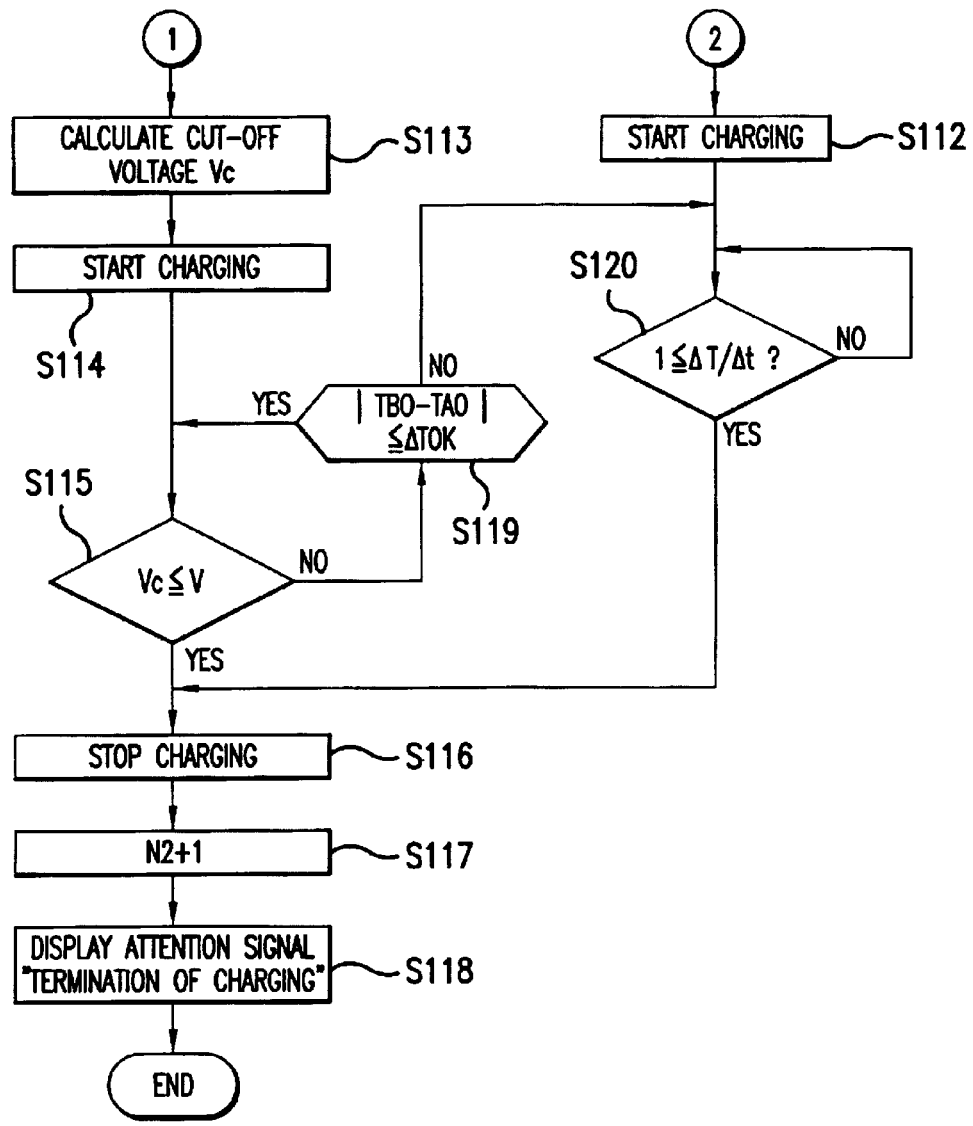
FIG. 3 is a flow chart showing a second essential portion of the ordinary charging.

FIG. 3 is a flow chart showing a second essential process of the ordinary charging. In step S113, a cut-off voltage Vc is calculated on the basis of the following calculation equation.

$$Vc = V0 - (TA0 - 25) \times \alpha + \beta \qquad (1)$$

It is to be noted that the equation (1) for calculating the cut-off voltage will be described in detail later. In step S114, the ordinary charging is started. The ordinary charging is performed by supplying a constant charging current, for example, 1.6 amperes.

In step S115, it is decided whether or not the battery voltage V is equal to or more than the cut-off voltage Vc. If the battery voltage V is equal to or more than the cut-off voltage, it is decided that the battery is charged to a charge level equivalent to a specific ratio, for example, 97% of the full-charge level, and in this case, the process goes on to step S116, in which the ordinary charging is stopped. In step S117, the value of the counter N2 is incremented by 1 (N2→N2+1). In the case where the decision in each of steps S109 and S110 is performed on the basis of comparison of a random number with a predetermined reference value, the processing of step S117 can be omitted. The process goes on to step S118, in which an attention signal "Termination of Charging" is displayed on the display portion 27.

If the answer in step S115 is denied, that is, if it is decided that the battery is not charged to the specific charge level yet, the process goes on to step S119. In step S119, it is decided whether or not the difference between the environmental temperature TA0 and the battery temperature TB0 is equal to or less than the predetermined charging starting temperature difference ΔTOK. If the difference between the environmental temperature TA0 and the battery temperature TB0 is equal to or less than the predetermined charging starting temperature difference ΔTOK, the process is goes back to step S115, in which it is again decided whether or not the battery voltage V is equal to or more than the cut-off voltage Vc. Meanwhile, if the difference between the environmental temperature TA0 and the battery temperature TB0 is more than the predetermined charging starting temperature difference ΔTOK, the process goes on to step S120. In step S120, it is decided whether or not a battery temperature change rate ΔT/Δt is equal to or more than a specific value, which is set to, for example, 1° C./min. As the charge level becomes 90 to 95% of the full-charge level, the rate of temperature rise of the battery becomes rapidly large. Accordingly, it can be decided whether or not the charge level becomes 90% or more of the full-charge level, by checking whether or not the rate of temperature rise of the battery becomes a specific value or more. If the answer in step S120 is affirmative (YES), it is decided that the charge level sufficient for the rapid charging is obtained, and the process goes on to step S116, in which the rapid charging is stopped.

In this embodiment, it is decided, on the basis of the rate of temperature rise of the battery, whether or not the charge level sufficient for the rapid charging is obtained. However, the reference for deciding the charge level sufficient for the rapid charging is not limited thereto but may be replaced with a charging cut-off voltage that is specialized for the rapid charging. To be more specific, two kinds of charging cut-off voltages may be set, wherein the lower cut-off voltage be used as the reference for deciding termination of the rapid charging, and the higher cut-off voltage be used as the reference for deciding termination of the ordinary charging other than the rapid charging.

Figure 4:
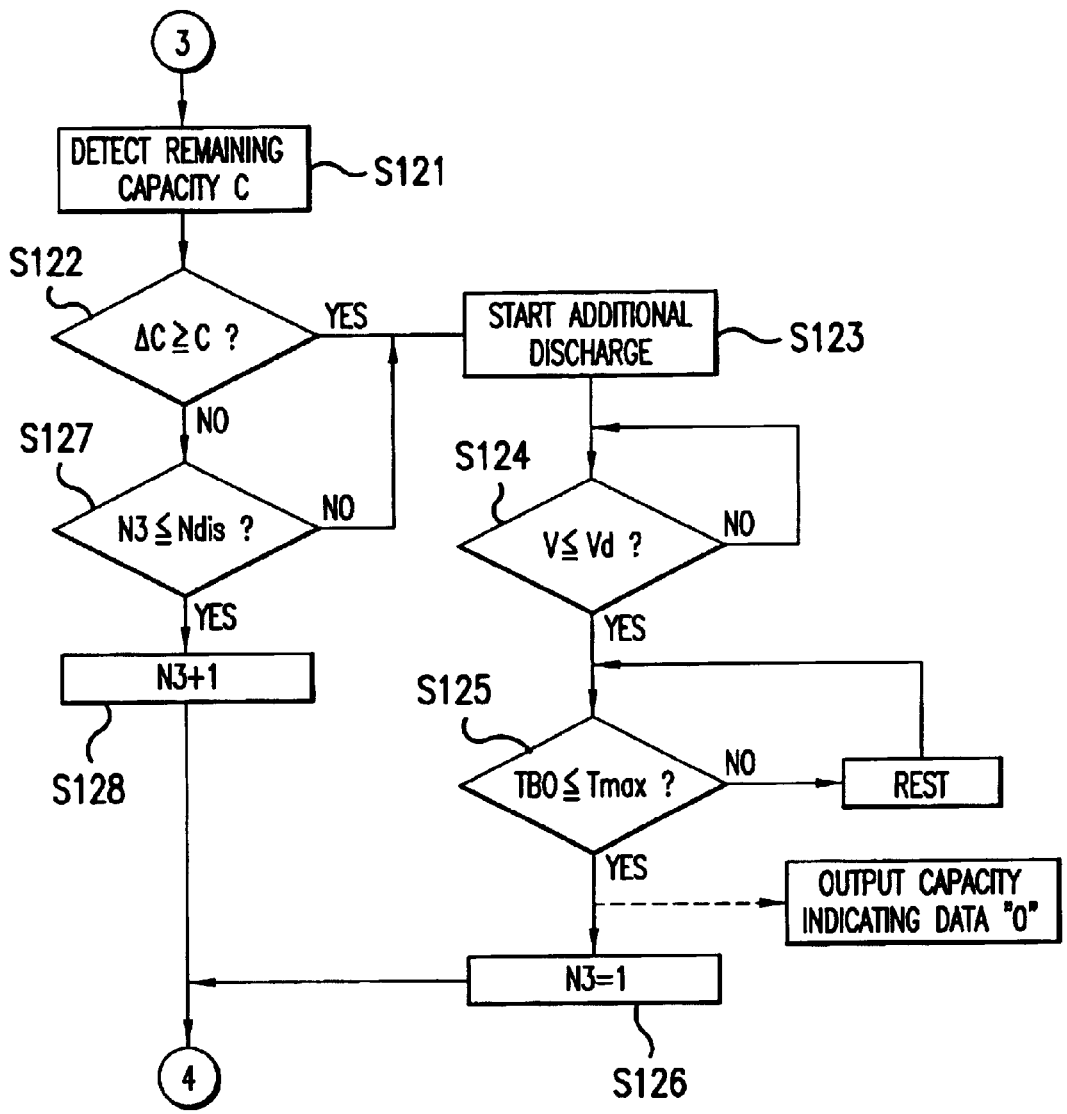
FIG. 4 is a flow chart showing a first essential process of refresh charging.

The refresh charging process will be described below with reference to FIGS. 4 and 5. FIG. 4 is a flow chart showing a first essential process of the refresh charging. In step S121, a remaining capacity C of the battery 11 is detected by the capacity calculating portion 13. In step S122, it is decided whether or not the remaining capacity C is equal to or less than a discharge reference remaining capacity ΔC. By repeating the ordinary charging, the charge level at a specific charging voltage is decreased due to the "charging memory effect" and also a discharge capacity is decreased. For this reason, the remaining capacity of the battery is detected prior to the refresh charging. In this case, if the remaining capacity of the battery is equal to or less than the discharge reference capacity ΔC, a discharge curve of the battery 11 is restored to the original state by discharging the battery.

If the answer in step S122 is affirmative (YES), the process goes on to step S123, to start additional discharging, that is, "refresh discharging." In step S124, it is decided whether or not the battery voltage V is equal to or less than a specific discharge cut-off voltage Vd. If the battery voltage V is equal to or less than the specific cut-off voltage Vd, the process goes on to step S125, in which it is decided whether or not the battery temperature TB0 is equal to or less than the predetermined charging starting temperature Tmax. The reason for executing the processing in step S125 is that since the battery temperature is raised by discharging the battery, the discharging operation must be shifted to the charging operation after the battery temperature is lowered to the specific charging starting temperature.

If it is decided that the battery temperature becomes equal to or less than the predetermined charging starting temperature Tmax, the process goes on to step S126, in which a counter N3 is reset to "1". The counter N3 is provided for deciding the number of times of the repeated refresh charging after the refresh discharging.

If the answer in step S122 is denied, the process goes on to step S127. In step S127, it is decided whether or not the value of the counter N3 is equal to or less than a discharge reference counter number Ndis. If the answer in step S127 is denied (NO), the process goes to step S123. That is to say, in the case where the number of times of the repeated refresh discharging does not exceeds the specific number Ndis, the refresh discharging is performed even if the remaining capacity C of the battery 11 is more than the discharge reference remaining capacity ΔC.

If the answer in step S127 is affirmative (YES), the process goes on to step S128, in which the value of the counter N3 is incremented by 1 (N3→N3+1). After the refresh discharging is terminated, a capacity indication data "0" is outputted for correcting the zero indication of the remaining capacity in the remaining capacity displaying portion 43.

Figure 5:
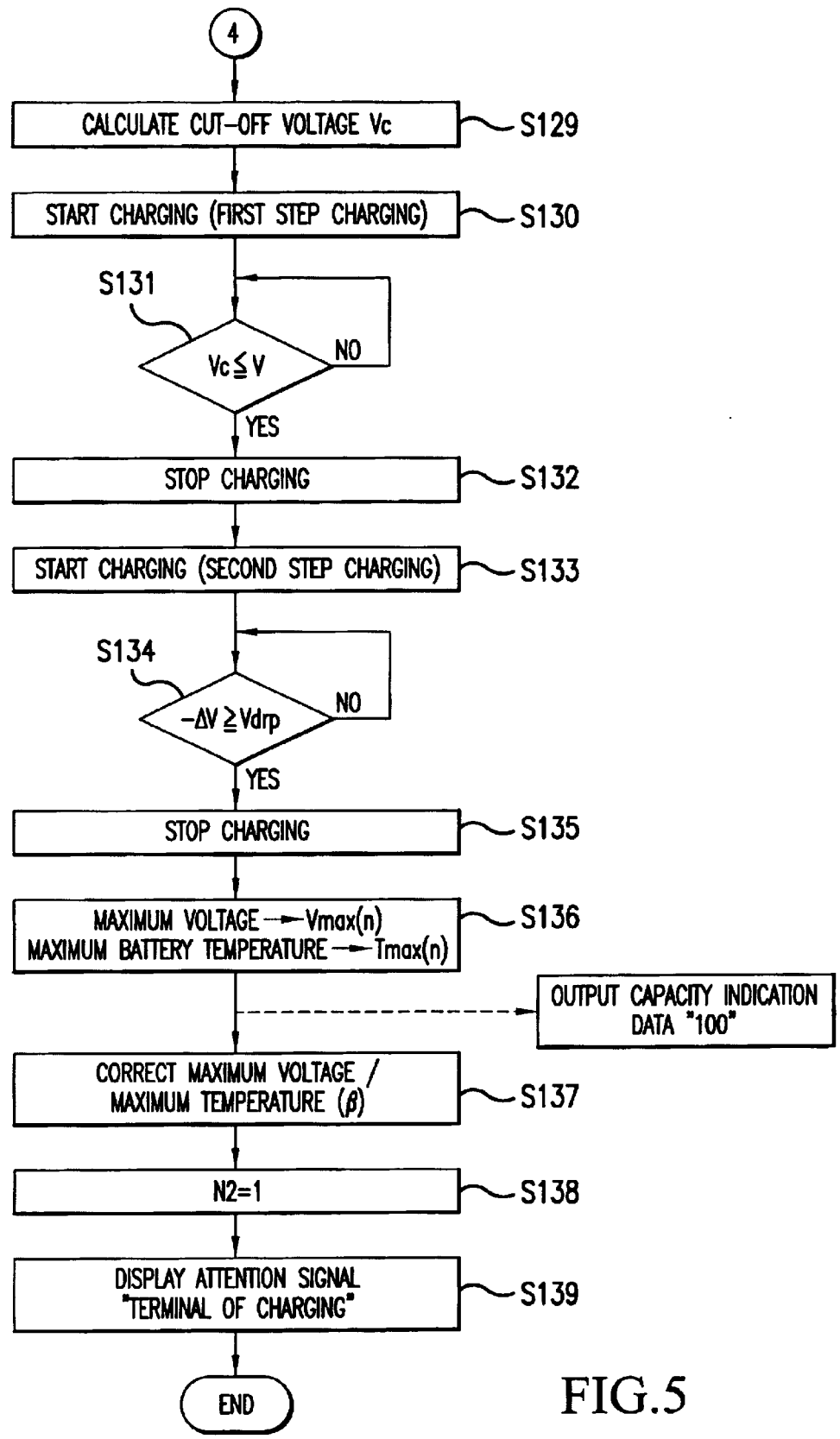
FIG. 5 is a flow chart showing a second essential process of the refresh charging.

FIG. 5 is a flow chart showing a second essential process of the refresh charging. The process goes on from step S128 shown in FIG. 4 to step S129 shown in FIG. 5. In step S129, the cut-off voltage Vc is calculated on the basis of the equation (1), and in step S130, the refresh charging procedure is started. The refresh charging is performed in two-stages at two different charging currents. The reason for this will be described in detail with reference to FIG. 6. The first stage charging is started at a higher current, for example, 2.5 amperes. In step S131, it is decided whether or not the battery voltage V is equal to or more than the cut-off voltage Vc. If the battery voltage V is equal to or more than the cut-off voltage Vc, it is decided that the battery is charged to a charge level of a specific ratio, for example, 97% of the full-charge level, and in this case, the process goes on to step S132, in which the first stage refresh charging is stopped. In step S133, the second refresh charging is started at a current lower than the charging current for the first stage refresh charging, for example, 1.0 ampere.

In step S134, it is decided whether or not a voltage change Vdrp of the battery 11 is a reference drop voltage $-\Delta V$ or more. The reference drop voltage $-\Delta V$ is a voltage change in a period of a specific processing time dt, and is set to, for example, $-50$ mV. In other words, in step S134, it is decided whether or not the battery voltage becomes a trailing state.

If the battery voltage becomes the trailing state, it is decided that the charge level saturates or exceeds the full-charge level, and in this case, the process goes on to step S135, in which the refresh charging is stopped.

In step S136, a maximum battery voltage Vmax(n) and a maximum battery temperature Tmax(n) during refresh charging are recorded. After the battery voltage and the battery temperature are recorded, that is, after the refresh charging is terminated, a capacity indication data "100" is outputted for correcting the full-charge indication of the remaining capacity in the remaining capacity displaying portion 43.

In step S137, a battery deterioration coefficient β of the cut-off voltage is, calculated. Since the battery 11 is deteriorated, the charge amount cannot be accurately controlled if the cut-off voltage is left as fixed, that is, not corrected. A calculation equation for correction will be described later together with the equation (1). In step S138, the counter N2 is reset to "1" (N2=1). In the case where the decision in each of steps S109 and S110 is performed on the basis of comparison of a random number with a predetermined reference value, the processing of step S138 can be omitted. The process goes on to step S139, in which an attention signal "Termination of Charging" is displayed on the display portion 27.

Figure 6:
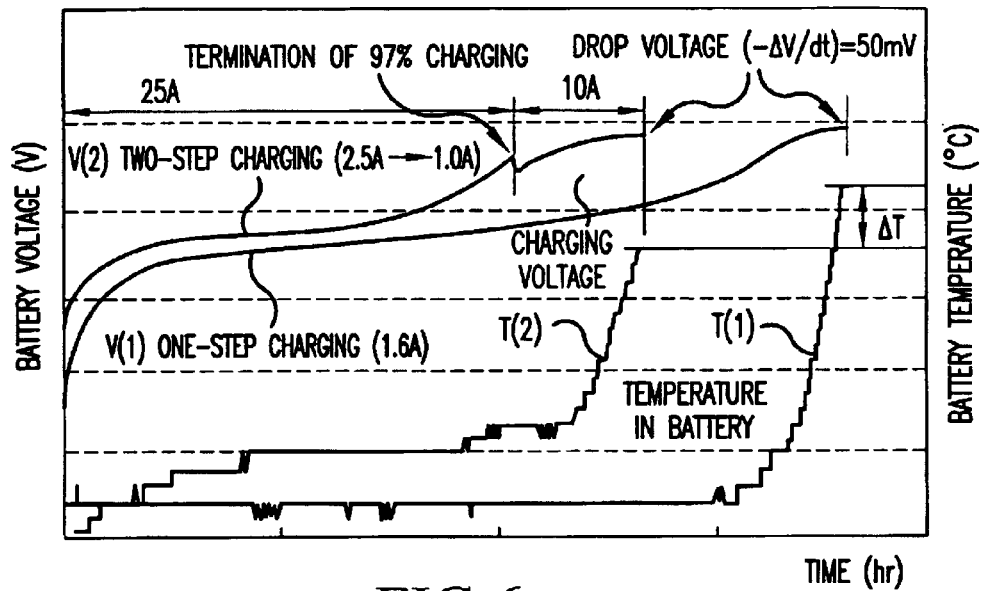
FIG. 6 is a diagram showing changes in battery voltage and battery temperature with an elapse of a charging time upon refresh charging.

FIG. 6 is a diagram showing changes in battery voltage V and battery temperature TB1 with an elapse of a charging time upon refresh charging, wherein data for the above-described two-stage refresh charging at two currents are compared with data for one-stage refresh charging at a constant current. The battery voltage V upon the two-stage refresh charging is shown by a line V(2) and the battery voltage V upon the one-stage refresh charging is shown by a line V(1), and the battery temperature TB1 upon the two-stage refresh charging is shown by a line T(2) and the battery temperature TB1 upon one-stage refresh charging is shown by a line T(1).

As shown in FIG. 6, in the two-stage refresh charging, since the first stage refresh charging is performed at a higher current (2.5 amperes), the battery can be charged to a charge level close to the full-charge level, more specifically, 97% of the full-charge level for a relatively short period of time. As a result, although the first stage refresh charging is shifted to the second stage refresh charging performed at a lower current (1.0 ampere), the battery can be eventually charged to a charge level more than the full-charge level for a short period of time as a whole.

In the one-stage refresh charging, since the refresh charging is performed at the same current as that used for the ordinary charging (1.6 amperes), the total time required for completion of the one-stage refresh charging becomes significantly longer than the total time required for completion of the two-stage refresh charging. In addition, as shown in FIG. 6, a temperature difference Δt occurs between the battery temperature TB1 upon the one-stage refresh charging which takes a longer time and the battery temperature TB1 upon the two-stage refresh charging which takes a shorter time.

According to the above-described two-step refresh charging method, the refresh charging of the battery to a charge level over the full-charge level takes only a short time nearly equal to that required for the ordinary charging. As a result, the refresh charging does not give any feeling of incompatibility with the ordinary charging due to a difference in charging time therebetween to a user who is unconscious of a difference between the ordinary charging and refresh charging. In addition, since the rising degree of the battery temperature TB1 is small, it is possible to improve the durability of the battery.

Figure 7:
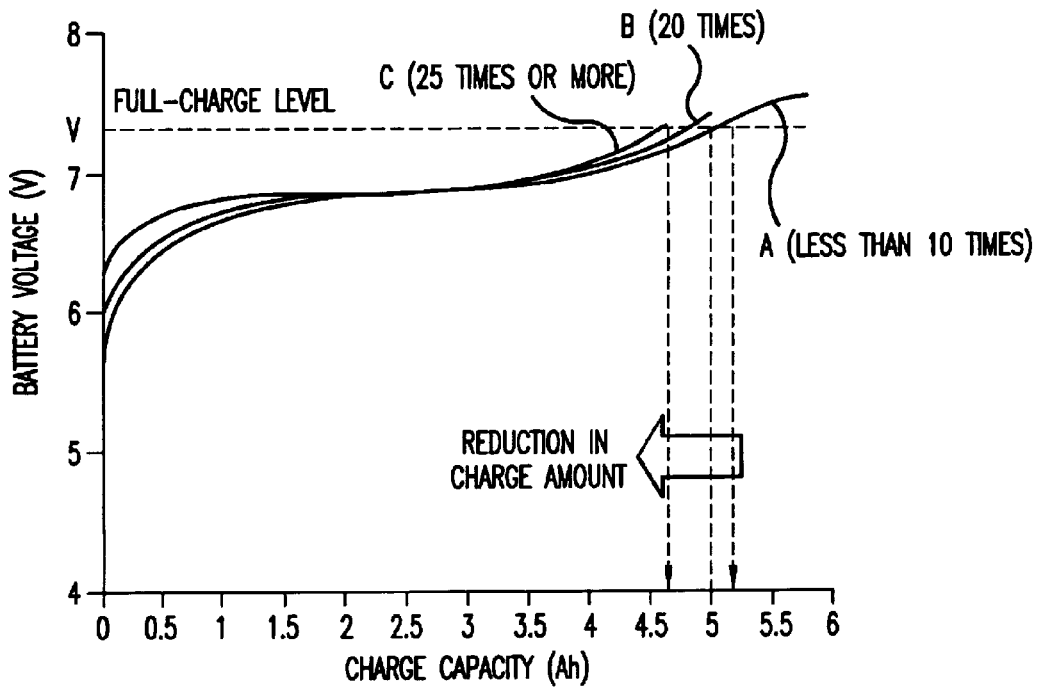
FIG. 7 is a diagram showing a relationship between the number of times of the ordinary charging and a change in charge amount.

FIG. 7 is a diagram showing a relationship between the number of times of the repeated ordinary charging and a change in charge amount. In an initial state wherein the number of times of the repeated ordinary charging is equal to or less than 10 (see line A), the charge amount increases to a large value along an initial charging characteristic curve. However, as the number of times of the repeated ordinary charging becomes larger than 10, there occurs a change in charging characteristic, with a result that a charge amount comparable to that obtained in the initial state cannot be obtained even at a battery voltage V corresponding to the full-charge level. In a state wherein the number of times of the repeated ordinary charging is equal to or less than 20 (see line B), the charge amount at the battery voltage V becomes a value 5 Ah, which is smaller than that in the initial state but keeps a nearly practical level. In a state wherein the number of times of the repeated ordinary charging is equal to or more than 25 (see line C), the charge amount at the battery voltage V is reduced to a value 4.7 Ah, which is an undesirable value from a practical viewpoint. According to this embodiment, since a random number Nran is set to be randomly selected from 0 to 9 and the reference value Nref to be compared with the value of the counter N2 is set to 10, even if the rapid charging is frequently performed, at least one refresh charging is performed until the charging is repeated by 10 times.

Figure 8:
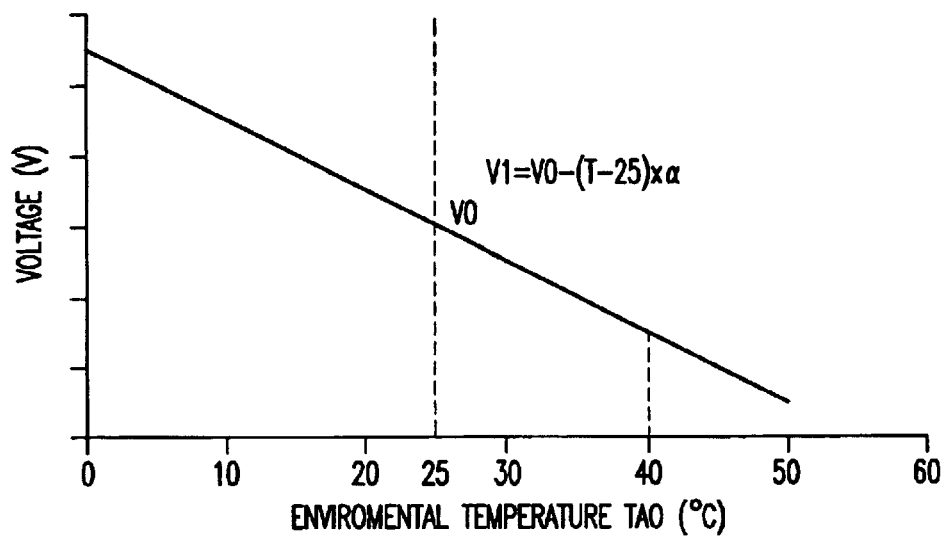
FIG. 8 is a diagram showing a relationship between an environmental temperature and a charging termination voltage.

FIG. 8 is a diagram showing a relationship between an environmental temperature TA0 and a charging termination voltage V1. As shown in this diagram, the charging termination voltage V1 is changed depending on the environmental temperature TA0. Specifically, as the environmental temperature TA0 becomes high, the charging termination voltage V1 becomes low. Accordingly, like the charging termination voltage V1, the cut-off voltage Vc used as the reference for deciding whether or not the charging should be terminated may be changed depending on the environmental temperature TA0. The above-described equation (1) is determined on the basis of such a characteristic of the charging termination voltage V1.

In FIG. 8, the charging termination voltage at an environmental temperature of 25° C. is taken as a reference voltage V0, which is set to, for example, 29.6 V. If the environmental temperature is deviated from 25° C., the charging termination voltage V1 is changed in proportional to the deviated amount of the environmental temperature. Accordingly, as shown in the following equation (1a), the cut-off voltage Vc corresponding to the environmental temperature TA0 can be obtained by subtracting, from the reference voltage V0, a value obtained by multiplying a difference between the environmental temperature TA0 and the reference environmental temperature 25° C. by a correction coefficient α (for example, 0.01).

$$Vc = V0 - (TA0 - 25) \times \alpha \qquad (1a)$$

The above-described equation (1) is given by adding a coefficient β to the cut-off voltage Vc calculated on the basis of the equation (1a). The coefficient β is a deterioration coefficient, which takes into account the battery characteristic deteriorated each time the charging is repeated. The calculation of the deterioration coefficient β in step S137 is performed on the following equation:

$$\beta = \{(Vmax(1)/Vmax(R)) - (Tmax(1) - 25) \times \gamma\} - \{(Vmax(n)/Vmax(R)) - (Tmax(n) - 25) \times \gamma\} \qquad (2)$$

In the equation (2), Vmax is a battery maximum voltage (full-charge voltage) at each charging, and Tmax is a battery maximum temperature at each charging; and character "(1)" denotes an initial value, that is, a value at the initial charging, character "(n)" denotes the present value, and character "(R)" denotes a reference value at the reference environmental temperature 25° C. Because of the deterioration of the battery, in the equation (2), the battery voltage Vmax(n) is lower than the battery voltage Vmax(1), and the battery temperature Tmax(n) is higher than the battery temperature Tmax(1). Accordingly, as the number of times of the repeated charging becomes large, the coefficient β becomes large, to thereby set the cut-off voltage Vc at a higher value for compensating for the deterioration of the battery. It is to be noted that y denotes a coefficient of the temperature compensation.

Figure 9:
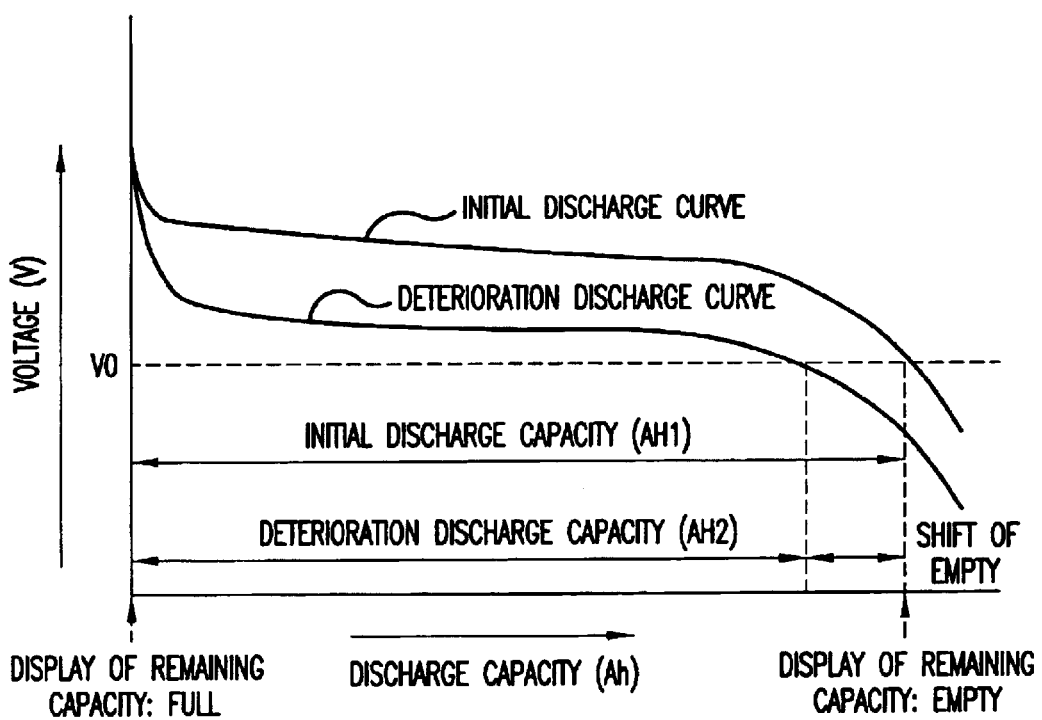
FIG. 9 is a diagram showing a battery discharge curve.

A method of displaying the remaining capacity of the battery 11 by using the remaining capacity displaying portion 43 will be described below. FIG. 9 is a diagram showing a battery discharge curve. As shown in this diagram, the discharge capacity at a specific battery voltage V0 in the initial state of the battery is taken as a discharge capacity AH1. As the battery is deteriorated, the discharge capacity at the specific battery voltage V0 becomes a discharge capacity AH2 (<AH1). In other words, the battery in the deteriorated state becomes empty earlier than the battery in the initial state does. As a result, if the scale, that is, the display range of the remaining capacity displaying portion 43 is set such that a mark "Full" is placed at a position corresponding to the full-charge level of the battery in the initial state and a mark "Empty" is placed at a position corresponding to the empty level of the battery in the initial state, when the remaining capacity of the battery becomes empty at the time of deterioration of the battery, the remaining capacity pointer does not indicate the mark "Empty." As shown in FIG. 9, the empty level of the remaining capacity of the battery in the deteriorated state is shifted from that in the initial state. In this case, if a user does not recognize the deterioration of the battery, he or she would erroneously recognize that the capacity of the battery remains yet, although the remaining capacity of the battery is actually empty.

To cope with such an inconvenience, according to this embodiment, if the discharge capacity corresponding to a specific voltage value becomes small as a result of deterioration of the battery, the scale of the remaining capacity displaying portion 43 is set to become correspondingly narrow.

FIG. 10 is a front view of the remaining capacity displaying portion 43 before deterioration of the battery, and FIG. 11 is a front view of the remaining capacity displaying portion 43 after deterioration of the battery. In each of FIGS. 10 and 11, a display area of the remaining capacity displaying portion 43 is composed of a remaining capacity display area 431 and a warning area 432. A remaining capacity pointer 433 is moved over the whole area including the remaining capacity display area 431 and the warning area 432, to indicate a position corresponding to the remaining capacity of the battery. A sector plate 50, which is a partial disk for displaying the warning area 432, has the same curvature as that of a partial circular window 51 for displaying the remaining capacity displaying area. The sector plate 50 is allowed to be displaced, along the curvature of the partial circular window 51, up to a position at which it is overlapped to the partial circular window 51. The sector plate 50 includes a first coloring portion 501 and a second coloring portion 502. The first coloring portion 501 indicates the warning area 432. The second coloring portion 502 is provided with a mark indicating a position at which the remaining capacity is half of the full-charge level and a character representation "½". The boundary between the coloring portions 501 and 502 is provided with a mark indicating a position at which the remaining capacity is at the empty level with a character representation "E". The remaining capacity display area 431 is provided with a mark indicating a position at which the remaining capacity is at the full-charge level with a character representation "F".

According to the remaining capacity displaying portion 43 having the above-described configuration, in the non-deteriorated state of the battery, as shown in FIG. 10, the sector plate 50 having the same turning center as that of the remaining capacity pointer 433 is displaced at a position on the counterclockwise side in FIG. 10. In this state, the character representation "E" and the mark indicating the empty level are positioned at the left end of the partial circular window 51. Accordingly, the character representation "½" and the mark indicating the half level are positioned at the center of the partial circular window 51.

In the deteriorated state of the battery, as shown in FIG. 11, the sector plate 50 is displaced clockwise by an amount corresponding to the deterioration of the battery. To be more specific, a ratio of a full-charge capacity (relative capacity) detected upon the refresh charging to the absolute capacity of the battery is calculated, and the sector plate 50 is displaced clockwise by an amount corresponding to the calculated ratio of the relative capacity/absolute capacity of the battery. Accordingly, in this state, the character representation "E" and the mark indicating the empty level are shifted from the left end to the center of the partial circular window 51. As a result, the remaining capacity display area 431 becomes narrow due to the shift of the warning area 432 to cover a low remaining capacity range of the remaining capacity display area 431. In other words, the display scale is reduced. Although the display scale is reduced due to the shift of the warning area 432 to cover the low remaining capacity range of the remaining capacity display area 431, the size of the warning area 432 itself is not changed. As a result, in the deteriorated state of the battery 11, the remaining capacity displaying portion 43 with the reduced display scale makes it possible to inform a user of the deterioration of the battery 11 while keeping the function, for giving the user a warning if the battery 11 is empty, in the warning area 432.

In this way, by shifting the character representation "E", which represents the battery being empty, and the mark indicating the empty level, to reduce the display scale, it is possible for a user to easily recognize the deterioration of the battery and the degree thereof. In addition, the reduction of the display scale, which is realized by shifting the position of representation "E" in this embodiment, may be realized by shifting the position of representation "F", which represents the full-charge level of the battery, on the empty side.

In the example shown in FIGS. 10 and 11, the remaining capacity displaying portion 43, in which the display scale is reduced on the basis of the degree of deterioration of the battery, adopts an analogue display manner. However, it can adopt a digital segment display manner. FIGS. 12 and 13 show a digital segment display manner of the remaining capacity displaying portion 43, wherein the remaining capacity of the battery in the non-deteriorated state is displayed by using segments in FIG. 12, and the remaining capacity of the battery in the deteriorated state is displayed by using the segments in FIG. 13. In the non-deteriorated state, as shown in FIG. 12, a remaining capacity display range is set by an area formed by ten pieces of the segments. On the other hand, in the deteriorated state, as shown in FIG. 13, the remaining capacity display range is reduced to an area formed by eight pieces of the segments, with the remaining two segments used as a warning area.

Figure 14:
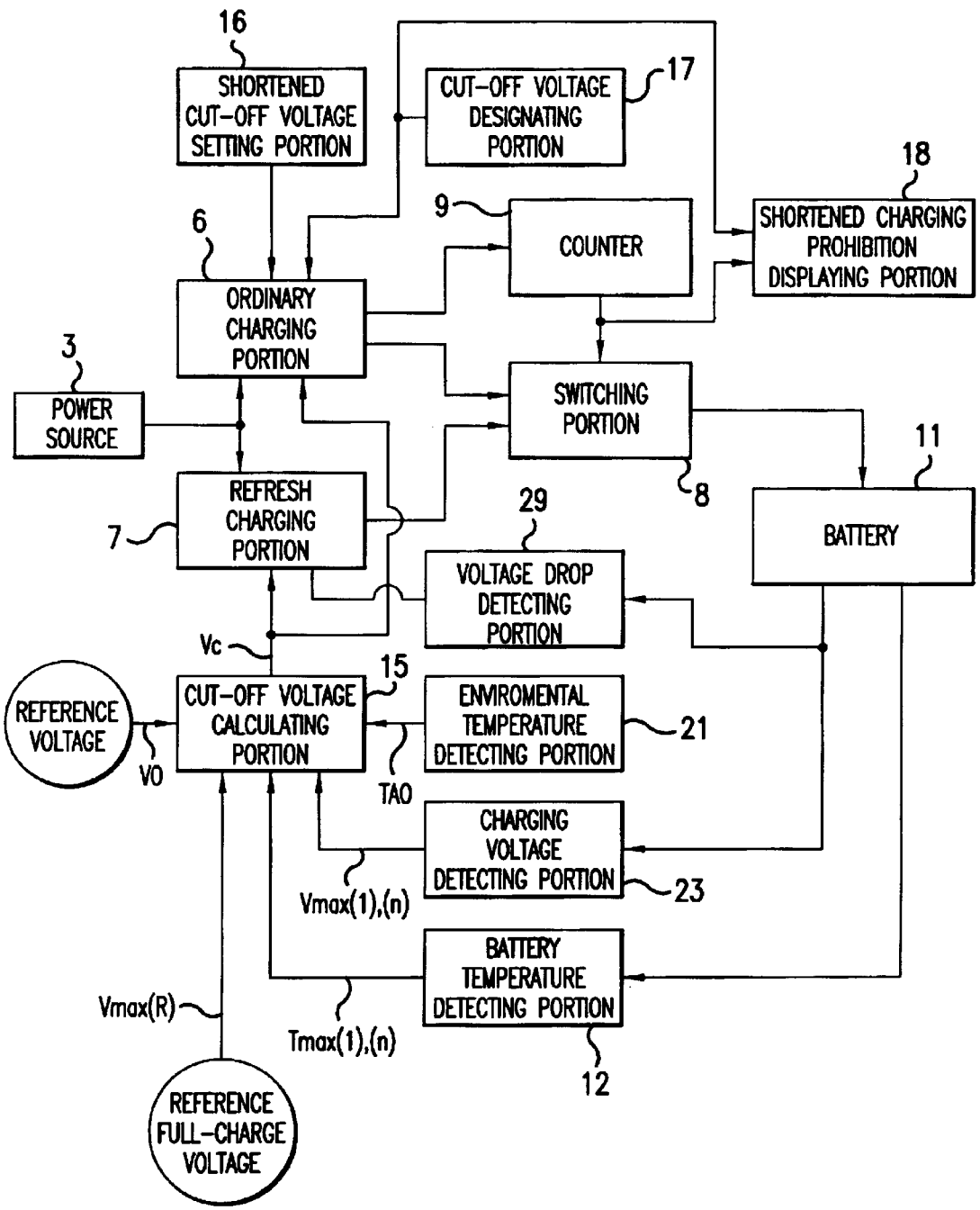
FIG. 14 is a block diagram showing a first essential function of the embodiment of the present invention.

FIG. 14 is a block diagram showing a first essential function of this embodiment. An ordinary charging portion 6 performs a first charging control to stop the charging at a charge level less than a full-charge level, and a refresh charging portion 7 performs a second charging control to stop the charging at a charge level over the full-charge level by a specific amount.

The refresh charging portion 7 uses two-step charging currents each of which is different from a charging current used for the ordinary charging portion 6. Accordingly, each of the ordinary charging portion 6 and the refresh charging portion 7 is provided with means for setting a current supplied from the power source 3 at a specific value.

A current supplied from the power source 3 is supplied to the battery 11 via either the ordinary charging portion 6 or the refresh charging portion 7. A switching portion 8 is provided for selecting either the ordinary charging portion 6 or the refresh charging portion 7. To be more specific, when a value N2 of a counter 9 for counting the number of times of the repeated ordinary charging becomes a specific value (preferably, in a range of less than 20), the switching portion 8 is operated to select the refresh charging portion 7. When the charging by the refresh charging portion 7 is terminated, the counter 9 is reset.

The function of the counter 9 can be replaced with a function which instructs, if a random number generated from a random number generator is a specific value, the switching portion 8 to select the refresh charging portion 7. The use of such a function allows the selection of the charging portion only by processing based on a program stored in a mnicrocomputer, to reduce the number of hardware parts.

The ordinary charging portion 6 allows the rapid charging performed for a shortened time, that is, the shortened charging. For such a function, two kinds of cutoff voltages as charging stop references are set in the ordinary charging portion 6. One of the cut-off voltages is a first cut-off voltage calculated by a cut-off voltage calculating portion 15, and the other is a second cut-off voltage, lower than the first cut-off voltage, which is set by a shortened cut-off voltage setting portion 16. With the use of the second cut-off voltage, the rapid charging can be terminated for a relatively short time. Although the time point at which the rapid charging should be terminated is based on the specific voltage in this embodiment, it may be based on a rising rate of the battery temperature. In this case, when the rising rate of the battery temperature exceeds a specific value, the rapid charging may be terminated.

The rapid charging may be performed when a rapid charging switch (not shown) is operated to designate the above-described second cut-off voltage by a cutoff voltage designating portion 17. In this case, if the counter 9 is counted-up, the refresh charging by the refresh charging portion 7 is selected, with a result that an attention signal, for example, "Rapid Charging to be Prohibited" is displayed on a shortened charging prohibition displaying portion 18 as one function of the display portion 27.

The cut-off voltage used for each of the ordinary charging portion 6 and the refresh charging portion 7 is determined by correcting a reference voltage V0 with an environmental temperature TA0 detected by an environmental temperature detecting portion 21. The deterioration of the battery 11 is corrected on the basis of a reference full-charge voltage, an initial full-charge voltage Vmax(1), a present full-charge voltage Vmax(n), an initial maximum battery temperature Tmax(1), and a present maximum battery temperature Tmax(n). The initial full-charge voltage Vmax(1) and the present full-charge voltage Vmax(n) are detected by a charging voltage detecting portion 23, and the initial maximum battery temperature Tmax(1) and the present maximum battery temperature Tmax(n) are detected by a battery temperature detecting portion 12.

A voltage drop detecting portion 29 detects that during charging, the increasing tendency of the battery voltage is shift to the dropping tendency thereof. If the increasing tendency of the battery is shifted to the dropping tendency thereof, it is decided that the battery capacity is saturated, and accordingly, the refresh charging is stopped. In this way, the refresh charging is not terminated when the battery voltage reaches a specific cut-off voltage but is stopped when it is detected that the battery capacity is saturated.

Figure 15:
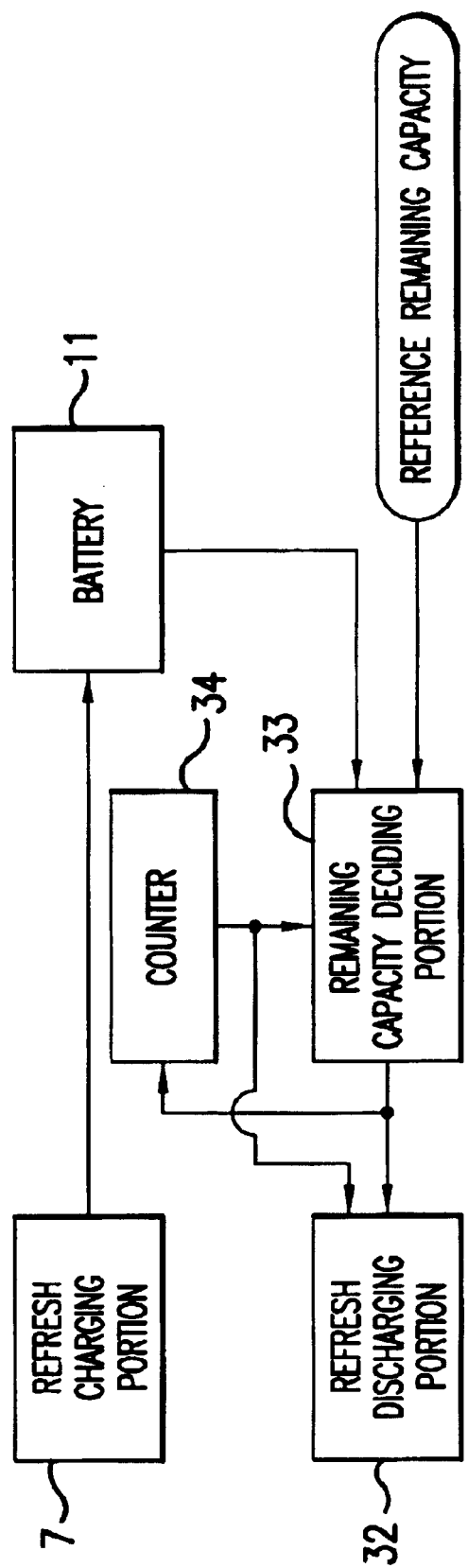
FIG. 15 is a block diagram showing a second essential function of the embodiment of the present invention.

FIG. 15 is a block diagram showing a second essential function of this embodiment. The refresh charging is performed under a specific condition after the discharge for refresh is performed. A refresh discharging portion 32 as one function of the charger 24 is operated to restore the discharging characteristic of the battery 11. A remaining capacity deciding portion 33 decides whether or not the remaining capacity of the battery 11 is equal to or less than a reference remaining capacity and outputs, if the remaining capacity is equal to or less than the reference remaining capacity, a discharge command to the refresh discharging portion 32. If the refresh discharging command is not outputted as a result of the decision of the remaining capacity deciding portion 33, a counter 34 is incremented. That is to say, the value of the counter 34 is representative of a gap between one refresh discharging and the next refresh discharging. If the value of the counter 34 reaches a predetermined reference value for a decision regarding the refresh discharging, the counter 34 is counted-up. Even if the remaining capacity of the battery 11 is more than the reference remaining capacity, the refresh discharging portion 32 performs discharge for refreshing the battery 11 in response to the count-up of the counter 34.

As is apparent from the above description, according to the present invention, when the charging specified to be stopped at a charge level less than a full-charge level is repeated until the number of times of the repeated charging or a random number corresponds to a specific value, the charging specified to be stopped at a charge level more than the full-charge level is performed. Accordingly, it is possible to prevent over-repetition of the charging of the battery at a charge level less than the full-charge level, and hence to refresh a deteriorated electrode plate of the battery and also eliminate a variation in deterioration among the cells. This is advantageous in improving the durability of the battery. Further, since the charging of the battery at a charge level less than the full-charge level is predominant, it is not required to provide a margin to the capacity of the electrode plate. This allows a critical design without the need of consideration of a reduction in capacity of a negative electrode due to local cell reaction. As a result, it is possible to provide a high capacity, compact battery capable of keeping a small capacity of a negative electrode and thereby reducing an NP ratio.

According to the present invention, since the random number generating means can be configured as a computer program, it is possible to eliminate the need of the provision of a counter as hardware, and hence to simplify the hardware configuration.

According to the present invention, since the charging can be stopped at a charging capacity further smaller than the full-charge level, it is possible to meet the requirement to terminate the charging of the battery for a short time. According to the present invention, when the charging of the battery to a charge level more than the full-charge level must be performed although the charging control is selected to terminate the charging for a short time, such a state can be displayed, to thereby eliminate an inconvenience wherein a user is distrustful of the state.

In particular, it is possible to perform the refresh charging of a secondary battery on the basis of a simple decision reference determined by the remaining capacity of the secondary battery or the number of times of the repeated charging of the secondary battery at a charge level more than a full-charge level, and hence to efficiently restore the charging/discharging characteristic of the secondary battery.

In particular, unlike the charging of the battery to a charge level less than the full-charge level, the charging of the battery to a charge level more than the full-charge level is performed at two-step currents by using the means for selectively switching the two-step currents, whereby the charging can be terminated for a short time while slowly charging the battery near the full-charge level. Accordingly, it is possible to reduce a difference in charging time between the control specified to stop the charging to a charge level less than the full-charge level and the control specified to stop the charging to a charge level more than the full-charge level, and hence to eliminate an inconvenience wherein a user receives an unfavorable feeling due to a variation in charging time. In addition, since the charging current switching timing in the second charging control can be based on a cut-off voltage value in the first charging control, the control can be simply performed without the provision of any deciding means.

According to the present invention, it is possible to detect the deterioration of a secondary battery and correct a cut-off voltage used for the decision of stopping the charging on the basis of the degree of deterioration of the secondary battery. As a result, it is possible to charge the secondary battery to a specific charging capacity regardless of the deterioration of the secondary battery.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

FIG. 1
1: battery unit
2: charger
3: power source
4: vehicular body
11: battery
12: battery temperature detecting portion
13: battery capacity calculating portion
14: memory
21: environmental temperature detecting portion
22: charging current detecting portion
23: charging voltage detecting portion
24: discharger
25: charging control portion
26: AC/DC converter
27: display portion 27
41: motor
42: motor driver
43: remaining capacity displaying portion FIG. 2
Start
S101: Display attention signal "During Charging"
S102: Detect battery temperature TB0
S104: Detect environmental temperature TA0
A107: rapid charging ?
S109: counter value N2≧Nref ?
S110: counter value N2≧Nref ?
S111: Display attention signal "Rapid Charging to be Prohibited"
FIG. 3
S113: Calculate cut-off voltage Vc
S114: Start charging
S116: Stop charging
S118: Display attention signal "Termination of Charging"
S112: Start charging
End
FIG. 4
S121: Detect remaining capacity C
S123: Start additional discharge
a: Output capacity indicating data "0"
FIG. 5
S129: Calculate cut-off voltage Vc
S130: Start charging (first step charging)
S132: Stop charging
S133: Start charging (second step charging)
S135: Stop charging
S136: maximum voltage→Vmax(n) maximum battery temperature→Tmax(n)
a: Output capacity indication data "100"
S137: Correct maximum voltage/maximum temperature (β)
S139: Display attention signal "Terminal of Charging"
End
FIG. 6
a: battery voltage (V)
b: battery temperature (C)
c: time (hr)
d: drop voltage
e: termination of 97% charging
f: charging voltage
g: temperature in battery
V(2) two-step charging (2.5 A→1.0 A)
V(1) one-step charging (1.6 A)
FIG. 7
a: battery voltage (V)
b: charge capacity (Ah)
c: full-charge level
d: reduction in charge amount
A (less than 10 times)
B (20 times)
C (25 times or more)
FIG. 8
a: voltage (V)
b: environmental temperature TA0 (C)
FIG. 9
a: voltage (V)
b: display of remaining capacity: Full
c: discharge capacity (Ah)
d: display of remaining capacity: Empty
e: initial discharge curve
f: deterioration discharge curve
g: initial discharge capacity (AH1)
h: deterioration discharge capacity (AH2)
i: shift of Empty
FIG. 14
3: power source
a: reference voltage b: reference full-charge voltage
16: shortened cut-off voltage setting portion
6: ordinary charging portion
7: refresh charging portion
15: cut-off voltage calculating portion
17: cut-off voltage designating portion
9: counter
8: switching portion
29: voltage drop detecting portion
21: environmental temperature detecting portion
23: charging voltage detecting portion
12: battery temperature detecting portion
18: shortened charging prohibition displaying portion
11: battery
FIG. 15
7: refresh charging portion
11: battery
32: refresh discharging portion
34 : counter
33: remaining capacity deciding portion
a: reference remaining capacity

What is claimed is:

1. A method of controlling the charging of a secondary battery, comprising the steps of:

controlling the charging of said secondary battery by using both a first charging control specified to stop the charging at a charge level less than a full-charge level and a second charging control specified to stop the charging at a charge level equal to or more than the full-charge level; and performing the next charging by said second charging control after the charging by said first charging control is continuously repeated by a specific number of times.

2. A system for controlling the charging of a secondary battery, comprising:

first charging control means for stopping the charging at a charge level less than a full-charge level;

second charging control means for stopping the charging at a charge level equal to or more than the full-charge level;

deciding means for deciding that the charging by said first charging control means is continuously repeated by a specific number of times; and control switching means for switching based on input from the deciding means that the charging by said first charging control means is continuously repeated by the specific number of times thereby switching said first charging control means to said second charging control means so as to perform the next charging by said second charging control means.

3. The system for controlling the charging of a secondary battery according to claim 2, wherein in said deciding means, the specific number of times of the repeated charging by said first charging control means is set to a value less than 20.

4. A system for controlling the charging of a secondary battery, comprising:

first charging control means for stopping the charging at a charge level less than a full-charge level;

second charging control means for stopping the charging at a charge level equal to or more than the full-charge level;

a random number generating means for generating a random number each time one charging by said first charging control means is performed; and control switching means for switching, if the random number generated by said random number generating means corresponds to a specific value equal to or less than the maximum value among the generated random numbers, thereby switching said first charging control means to said second charging control means so as to perform the next charging by said second charging control means.

5. The system for controlling the charging of a secondary battery according to claim 4, wherein the random number generated by said random number generating means is less than 20.

6. The system for controlling the charging of a secondary battery according to claim 2, further comprising:

a first cut-off voltage and a second cut-off voltage, either of which may be selected for stopping the charging of the battery by said first charging control means; and selecting means for selecting either the first cut-off voltage or the second cut-off voltage.

7. The system for controlling the charging of a secondary battery according to claim 3, further comprising:

a first cut-off voltage and a second cut-off voltage, either of which may be selected for stopping the charging of the battery by said first charging control means; and selecting means for selecting either the first cut-off voltage or the second cut-off voltage.

8. The system for controlling the charging of a secondary battery according to claim 4, further comprising:

a first cut-off voltage and a second cut-off voltage, either of which may be selected for stopping the charging of the battery by said first charging control means; and selecting means for selecting either the first cut-off voltage or the second cut-off voltage.

9. The system for controlling the charging of a secondary battery according to claim 5, further comprising:

a first cut-off voltage and a second cut-off voltage, either of which may be selected for stopping the charging of the battery by said first charging control means; and selecting means for selecting either the first cut-off voltage or the second cut-off voltage.

10. The system for controlling the charging of a secondary battery according to claim 6, wherein if a lower one of the first cut-off voltage or the second cut-off voltage is selected by said selecting means and said deciding means determines that the charging to a charge level less than the full-charge level is repeated by the specific number of times, said first charging control means is switched to said second charging control means.

11. The system for controlling the charging of a secondary battery according to claim 10, further comprising:

display means for displaying, when said second charging control means is selected, a signal indicating that said selection is canceled.

12. A method of controlling the charging of a secondary battery, comprising the steps of:

controlling the charging of said secondary battery by using both a first charging control specified to stop the charging at a charge level less than a full-charge level and a second charging control specified to stop the charging at a charge level equal to or more than the full-charge level;

performing the next charging by said second charging control after the charging by said first charging control is continuously repeated by a specific number of times; and discharging said secondary battery before the charging of said secondary battery if the state of said secondary battery satisfies a specific refresh discharge reference in said second charging control.

13. The method of controlling the charging of a secondary battery according to claim 12, wherein the refresh discharge reference is determined to be satisfied when the remaining capacity of said secondary battery is less than a specific value.

14. The method of controlling the charging of a secondary battery according to claim 12, wherein the refresh discharge reference is determined to be satisfied each time the charging by said second charging control is repeated by a specific number of times.

15. A system for controlling the charging of a secondary battery, comprising:

first charging control means for stopping the charging at a charge level less than a full-charge level;

second charging control means for stopping the charging at a charge level equal to or more than the full-charge level;

deciding means for deciding that the charging by said first charging control means is continuously repeated by a specific number of times;

control means switching means for switching, if it is decided by said deciding means that the charging by said first charging control means is continuously repeated by the specific number of times, thereby switching said first charging control means to said second charging control means so as to perform the next charging by said second charging control means; and refresh discharging means for discharging, if the state of said secondary battery satisfies a specific refresh discharge reference in the control by said second charging control means, said secondary battery before the charging of said secondary battery.

16. The system for controlling the charging of a secondary battery according to claim 15, wherein said refresh discharging means is configured to discharge said secondary battery when the remaining capacity of said secondary battery is less than a specific value.

17. The system for controlling the charging of a secondary battery according to claim 15, wherein said refresh discharging means is configured to discharge said secondary battery each time the charging by said second charging control means is repeated by a specific number of times.

18. A method of controlling the charging of a secondary battery, comprising the steps of:

controlling the charging of said secondary battery by using both a first charging control specified to stop the charging at a charge level less than a full-charge level and a second charging control specified to stop the charging at a charge level equal to or more than the full-charge level;

performing the next charging by said second charging control after the charging by said first charging control is continuously repeated by a specific number of times;

performing the charging by said first charging control at a first charging current; and performing the charging by said second charging control by a preceding charging performed at a second charging current larger than the first charging current and a subsequent charging performed at a third charging current smaller than the first charging current.

19. A system for controlling the charging of a secondary battery, comprising:

cut-off voltage storing means for setting a cut-off voltage corresponding to a specific capacity less than a full-charge level of said second battery;

first charging control means for charging said secondary battery at a first charging current and stopping the charging when a charging voltage of said secondary battery reaches said cut-off voltage;

second charging control means for charging said secondary battery at a second charging current larger than the first charging current until the charging voltage of said secondary battery reaches the cut-off voltage, and then charging said secondary battery at a third charging current smaller than the first charging current until the charge level of said secondary battery reaches the full-charge level; and switching means for selecting either said first charging control means or said second charging control means.

20. The system for controlling charging a secondary battery according to claim 19, and further comprising:

full-charge voltage storing means for storing a full-charge voltage of said secondary battery when the charging by said second charging control means is terminated; and correcting means for correcting a deteriorated proportion of said cut-off voltage on the basis of the value of the full-charge voltage stored in said full-charge voltage storing means.

21. The system for controlling the charging of a secondary battery according to claim 20, and further comprising:

full-charge voltage storing means for storing a full-charge voltage of said secondary battery when the charging by said second charging control means is terminated;

setting means for setting a reference full-charge voltage at a specific temperature of said secondary battery;

temperature storing means for storing a temperature of said secondary battery at the time when the full-charge voltage is stored in said full-charge voltage storing means; and correcting means for correcting a deteriorated proportion of said cut-off voltage on the basis of the value of the full-charge voltage stored in said full-charge voltage storing means, the value of the temperature of said secondary battery stored in said temperature storing means, and the reference full-charge voltage.

* * * * *